United States Patent
Sato et al.

(10) Patent No.: US 11,170,221 B2
(45) Date of Patent: Nov. 9, 2021

(54) OBJECT SEARCH SYSTEM, OBJECT SEARCH DEVICE, AND OBJECT SEARCH METHOD

(71) Applicant: HITACHI KOKUSAI ELECTRIC INC., Tokyo (JP)

(72) Inventors: Yosuke Sato, Kodaira (JP); Kenichi Kashima, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/642,828

(22) PCT Filed: Aug. 28, 2018

(86) PCT No.: PCT/JP2018/031694
§ 371 (c)(1),
(2) Date: Feb. 27, 2020

(87) PCT Pub. No.: WO2019/065045
PCT Pub. Date: Apr. 4, 2019

(65) Prior Publication Data
US 2020/0193159 A1 Jun. 18, 2020

(30) Foreign Application Priority Data

Sep. 26, 2017 (JP) .............................. JP2017-184592

(51) Int. Cl.
*G06K 9/00* (2006.01)
*G06T 19/00* (2011.01)
(52) U.S. Cl.
CPC ..... *G06K 9/00671* (2013.01); *G06K 9/00201* (2013.01); *G06T 19/006* (2013.01)
(58) Field of Classification Search
CPC .......................... G06K 9/00671; G06T 19/006
(Continued)

(56) References Cited

U.S. PATENT DOCUMENTS

2009/0243881 A1 10/2009 Alon et al.
2013/0172093 A1 7/2013 Leech
(Continued)

FOREIGN PATENT DOCUMENTS

JP 2005275723 A 10/2005
JP 200952907 A 3/2009
(Continued)

OTHER PUBLICATIONS

Nobata, Yoshinori et al., "Foreign object debris detection stem using W-band millimeter signal", Proceedings of the Engineering Sciences Society Conference of IEICE 2013; Sep. 3, 2013, C-14-14, p. 259.

(Continued)

*Primary Examiner* — Shivang I Patel
(74) *Attorney, Agent, or Firm* — Harness, Dickey & Pierce, P.L.C.

(57) ABSTRACT

Provided is a technology which facilitates a search for an object such as a falling object. This object search system is provided with: a detection device which detects position information on a falling object; and a scope which is worn by a user and provided with a display unit that displays an augmented reality space in a real space. The detection device detects an object by using a radar device. A radar control device calculates the detected position information on the object and transmits the calculated position information to the scope through a wireless transmission device. The scope displays the position information, which pertains to the falling object and is acquired from the detection device, on an augmented reality space with a specific indication (an arrow or a wave shape, etc.).

6 Claims, 4 Drawing Sheets

(58) Field of Classification Search
USPC .......................................................... 345/633
See application file for complete search history.

(56) References Cited

U.S. PATENT DOCUMENTS

| | | | |
|---|---|---|---|
| 2014/0055491 A1 | 2/2014 | Malamud et al. | |
| 2014/0354684 A1* | 12/2014 | Beckwith | G06K 9/00671 |
| | | | 345/633 |
| 2016/0078278 A1* | 3/2016 | Moore | G06K 9/00671 |
| | | | 345/8 |
| 2018/0090007 A1* | 3/2018 | Takemori | G01S 13/931 |

FOREIGN PATENT DOCUMENTS

| | | |
|---|---|---|
| JP | 2010004381 A | 1/2010 |
| JP | 2011242591 A | 12/2011 |
| JP | 201295914 A | 5/2012 |
| JP | 2012251900 A | 12/2012 |
| JP | 5603205 | 10/2014 |
| JP | 2015503399 A | 2/2015 |
| JP | 2015075832 A | 4/2015 |
| JP | 2015537264 A | 12/2015 |
| JP | 2016-172469 A | 9/2016 |
| WO | WO-2014170895 A1 | 10/2014 |

OTHER PUBLICATIONS

International Search Report (English and Japanese) issued in PCT/JP2018/031694, dated Oct. 30, 2018; ISA/JP.
Search Report and Written Opinion dated May 18, 2021 in corresponding Singapore application No. 11202001936S.

* cited by examiner (a)

(b)

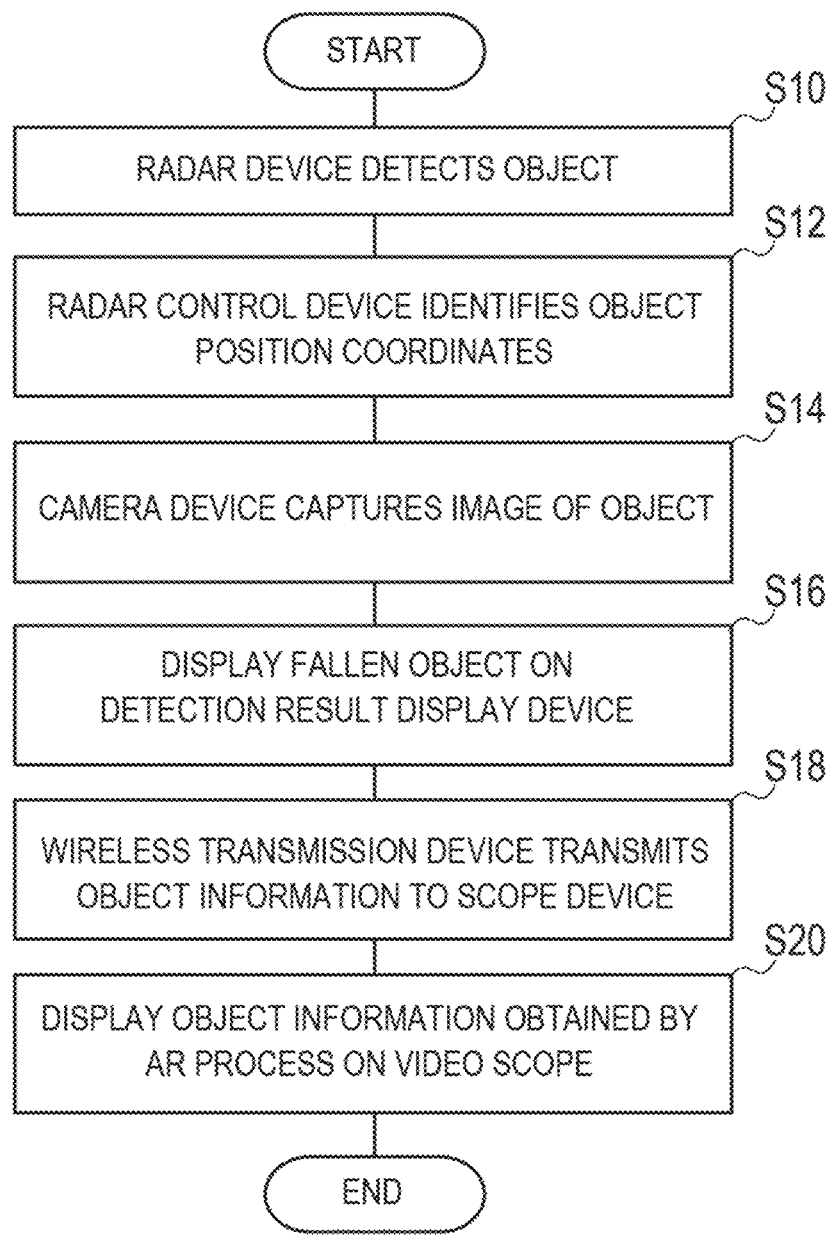

OBJECT SEARCH SYSTEM, OBJECT SEARCH DEVICE, AND OBJECT SEARCH METHOD

CROSS REFERENCE TO RELATED APPLICATIONS

This application is a U.S. National Phase Application under 35 U.S.C. 371 of International Application No. PCT/JP2018/031694 filed on Aug. 28, 2018, which is based on and claims the benefit of priority from Japanese Patent Application No. 2017-184592 filed on Sep. 26, 2017. The entire disclosures of all of the above applications are incorporated herein by reference.

TECHNICAL FIELD

The present invention relates to an object search system, an object search device and an object search method, and particularly to an object search system, an object search device and an object search method which display an augmented reality space, made out of a synthesized image, on a real space.

BACKGROUND ART

There is a system which detects an obstacle, a fallen object or the like (hereinafter referred to as a fallen object) from a vast area (a work site, a ground, an inside of a facility, a parking area, a road, a railway, a runway or the like) using a radar or the like. Such a system is capable of identifying a position (coordinates or the like) of the fallen object with some precision based on a result of the detection by the radar.

Once a fallen object is detected by the radar, a worker or the like of a management company goes to collect the fallen object. A conventional practice is that the worker or the like searches for the fallen object while seeing a map based on the coordinate information about the fallen object. For example, the map is displayed on a tablet, and a position of the fallen object is highlighted on the map.

Meanwhile, techniques using the AR (augmented reality) technique have been proposed in recent years (see, for example, Patent Literature 1 and Patent Literature 2). Patent Literature 1, for example, discloses a technique of displaying various types of additional information (AR information) on a head-mounted display device by superposing the various types of information on a real space (external scene). On the other hand, Patent Literature 2 discloses a technique of finding a target material or part from a large number of articles placed in a storage yard.

CITATION LIST

Patent Literature

Patent Literature 1: Japanese Patent Application Publication No. 2015-075832
Patent Literature 2: Japanese Patent Application Publication No. 2011-242591

SUMMARY OF INVENTION

Technical Problem

However, the search using the tablet involves a problem that the fallen object is difficult to find in the vast area with no mark. In addition, it is dangerous for the worker to perform the search while seeing the tablet. Furthermore, search time is not limited to daytime, and may be after dusk when there is a lack of sunlight. The search using the tablet involves a problem that a small fallen object is more difficult to search for in a situation where it is dim. The technique disclosed in Patent Literature 1 or 2 is not designed to search a vast area for an object. There has been a demand for a new technique.

The present invention has been made with the above situation taken into consideration, and an object of the present invention is to solve the above problems.

Solution to Problem

The present invention is an object search system including: a detection device which detects position information about an object; and an object search device to be worn by a user, and including a display which shows an augmented reality space on a real space. The detection device includes a transmitter which transmits the position information about the object to the object search device. The object search device includes: a receiver which receives the position information about the object transmitted from the detection device; an acquirer which acquires position information about the object search device; and a display controller which shows a specific display to specify a position of the object on the display based on the position information about the object and the position information about the object search device.

In addition, the display controller may show, as the specific display, a straight line indicating the position of the object such that the straight line extends to the position of the object.

Furthermore, the display controller may show, as the specific display, a display indicating nearness to the object in the position of the object.

Moreover, the display controller may increase the number of specific displays indicating the nearness, or make the specific display become larger, as the nearness to the object increases.

Besides, the display controller may show, as the specific display, an arrow indicating a direction toward the object.

In addition, the detection device may include a camera which captures an image of the object; the object search device may receive the image of the object; and the display controller may show the image on the display.

The present invention is an object search device to be worn by a user, and including a display which shows an augmented reality space on a real space. The object search device includes: a receiver which acquires position information about an object to be searched for; an acquirer which acquires position information about the object search device; and a display controller which shows a specific display to specify a position of the object on the display based on the position information about the object and the position information about the object search device.

In addition, the display controller may show, as the specific display, a straight line indicating the position of the object such that the straight line extends to the position of the object.

Furthermore, the display controller may show, as the specific display, a display indicating nearness to the object in the position of the object.

Moreover, the display controller may increase the number of displays indicating the nearness to the object, or make the display indicating the nearness become larger, as the nearness increases.

Besides, the display controller may show, as the specific display, an arrow indicating a direction toward the object.

An object search method according to the present invention includes: an object position acquiring step of acquiring position information about an object; a display position acquiring step of acquiring position information about an object search device to be worn by a user, and including a display which shows an augmented reality space on a real space; and a specific display step of showing, as a specific display reflecting a relationship between the position information about the object and the position information about the object search device, the position information about the object in the augmented reality space based on the position information about the object and the position information about the object search device.

Advantageous Effects of Invention

The present invention makes it possible to easily search for a fallen object in a situation where there is no information about a specific shape of the object.

BRIEF DESCRIPTION OF DRAWINGS

FIG. 4 is a block diagram illustrating a configuration of the object search system according to the embodiment.

DESCRIPTION OF EMBODIMENTS

Figure 1:
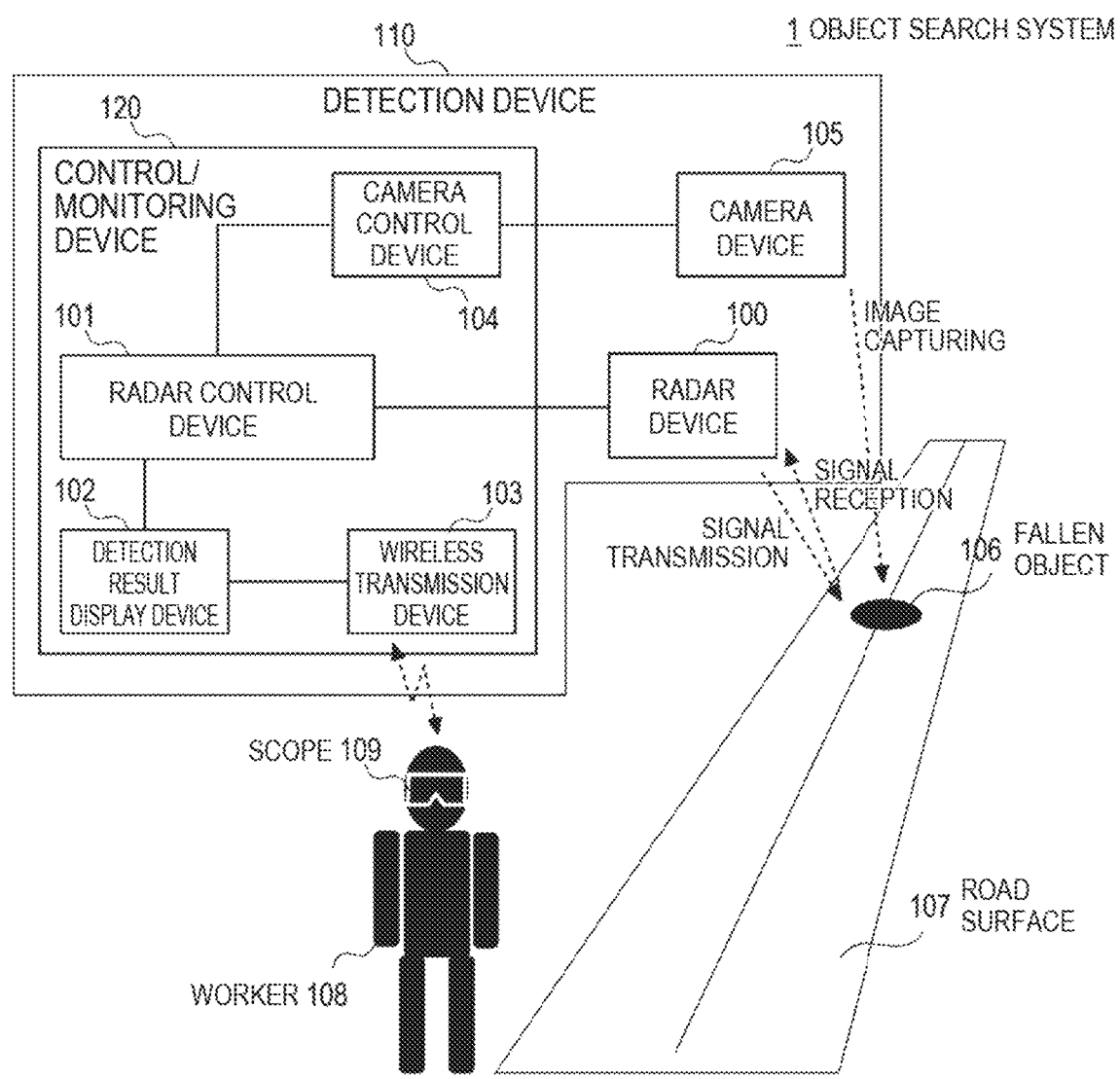
FIG. 1 is a block diagram illustrating a configuration of an object search system according to an embodiment.

Referring to the drawing, detailed descriptions will be hereinbelow provided for an embodiment of the present invention.

The embodiment will describe a technique of detecting an object in a vast area using the AR technique. Descriptions will be provided for an application example in which plant premises are searched for a fallen object by showing a specific display on a scope (object search device) including a transparent display.

Figure 2:
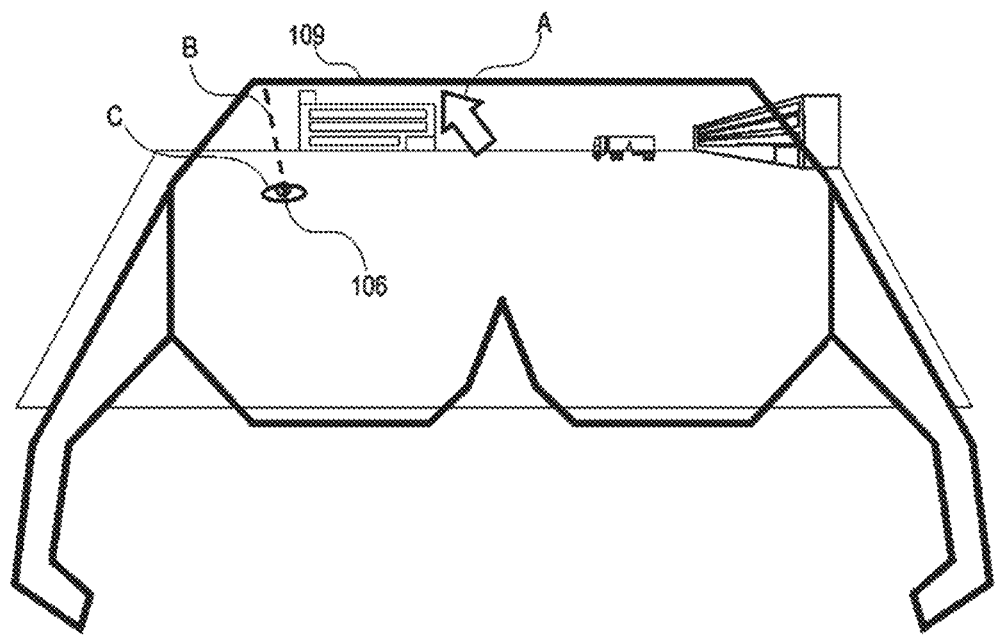
FIG. 2 is a block diagram illustrating a configuration of a scope according to the embodiment.
Figure 2:
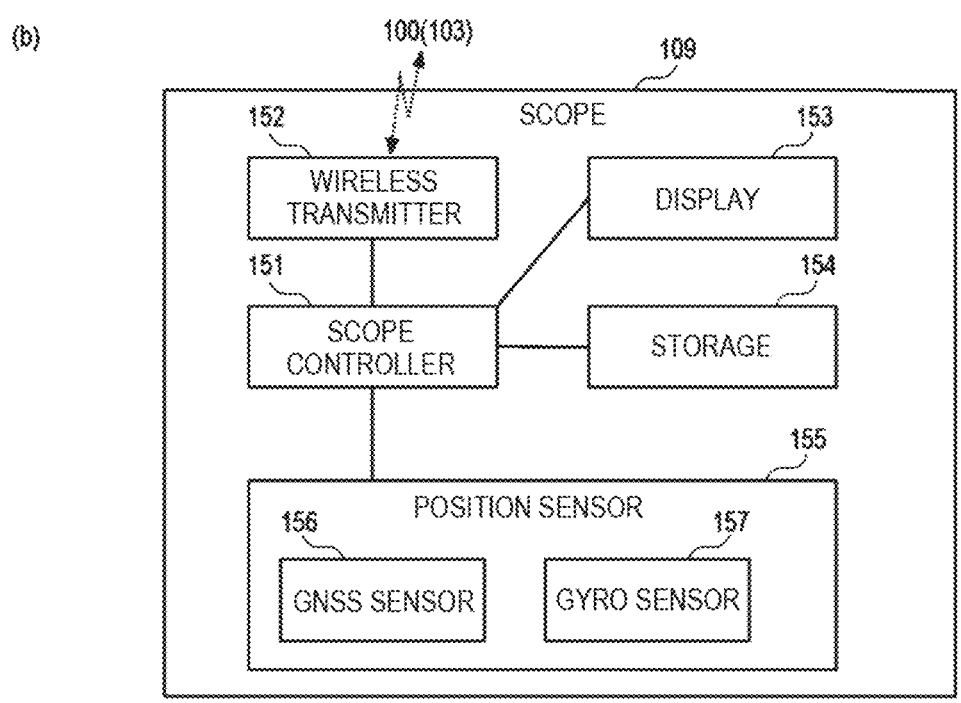

FIG. 1 is a block diagram illustrating a schematic configuration of an object search system 1 according to the embodiment. FIG. 2 is a diagram illustrating a scope 109. FIG. 2(a) is a block diagram illustrating an example of a display to be shown on the scope 109. FIG. 2(b) is a diagram illustrating a schematic configuration of the scope 109.

As illustrated in FIG. 1, the object search system 1 includes the scope 109 to be used by a worker 108, and a detection device 110. Information about a fallen object 106 which is detected by the detection device 110 is shown on the scope 109.

The detection device 110 includes: a radar device 100; a camera device 105; and a control/monitoring device 120 which controls the radar device 100 and the camera device 105. A surface condition of a road surface 107 is monitored using the radar device 100 and the camera device 105 to be installed within the premises. Where or how many radar devices 100 and camera devices 105 are to be installed is not particularly limited. Each radar device 100 and each camera device 105 are connected to the detection device 110 using optical fibers and the like, and can be remotely controlled.

The radar device 100, for example, detects the existence of the fallen object 106 by: transmitting a predetermined electromagnetic wave (for example, in a millimeter waveband with a frequency of 60 GHz or more); and receiving a wave reflected off the fallen object 106. Based on a detection result, the camera device 105 takes an image of the fallen object 106.

The control/monitoring device 120 includes a radar control device 101, a detection result display device 102, a wireless transmission device 103, and a camera control device 104.

The radar control device 101 controls the radar device 100. Furthermore, the radar control device 101 has a function of performing signal processing on a signal reception processing result, and acquires fallen object information (specifically, position information (coordinates) and shape information) about the fallen object 106 by searching a predetermined range by the radar periodically or based on manipulation by an administrator or the like.

Based on a result of the detection of the fallen object 106 by the radar device 100 and the radar control device 101, a camera control device 104 takes an image of the detected fallen object 106.

The detection result display device 102 displays the signal reception processing result obtained through the signal processing by the radar control device 101. Specifically, the detection result display device 102 displays things such as: a map showing the position coordinates and fall position which are representative of where the fallen object 106 is; and a real image of the fallen object 106 which is taken by the camera device 105.

Moreover, a wireless transmission device 103 is connected to the detection result display device 102, and transmits the fallen object information to portable terminals such as the scope 109 and a tablet (not illustrated) which the worker 108 carries.

The transmission of the fallen object information to the scope 109, the tablet and the like may be preformed manually by the administrator who visually checks the existence of the fallen object 106 by looking at the detection result display device 102, or may be performed automatically based on the information detected by the radar control device 101.

As illustrated in FIG. 2(b), the scope 109 includes a scope controller 151, a wireless transmitter 152, a display 153, a storage 154, and a position sensor 155.

The position sensor 155 includes, for example, a GNSS sensor 156 and a gyro sensor 157. The GNSS sensor 156 detects a position of the scope 109, that is to say, a position of the worker 108. The gyro sensor 157 detects a direction in which the scope 109 faces.

The wireless transmitter 152 acquires the fallen object information about the fallen object 106 and map information by making communications with the wireless transmission device 103 of the detection device 110, and stores the fallen object information and the map information onto the storage 154. Incidentally, the map information may be retained on the storage 154 in advance.

The scope controller 151 controls the entirety of the scope 109. In this respect, referring to FIG. 2(a), descriptions will be provided for a display mode in which the scope controller 151 controls a display on the display 153. The scope controller 151 compares a direction in which the worker 108 looks and the position of the fallen object based on the position information (coordinates) about the scope 109 acquired by the GNSS sensor 156 as well as the gyro sensor 157, and displays a direction toward the fallen object 106 (that is to say, a direction in which the worker 108 is to go) on the display 153 using an arrow A. A distance to the fallen object may be indicated by changing boldness and length of the arrow A.

In addition, the scope control 151 displays a line B (which may be a straight line or a broken line) extending from upper to lower sides on the field of view like a rainfall, in the position of the fallen object 106 which is acquired from the detection device 110. This display may blink. Furthermore, the distance between the fallen object 106 and the scope 109 may be displayed using a ripple C.

Figure 3:
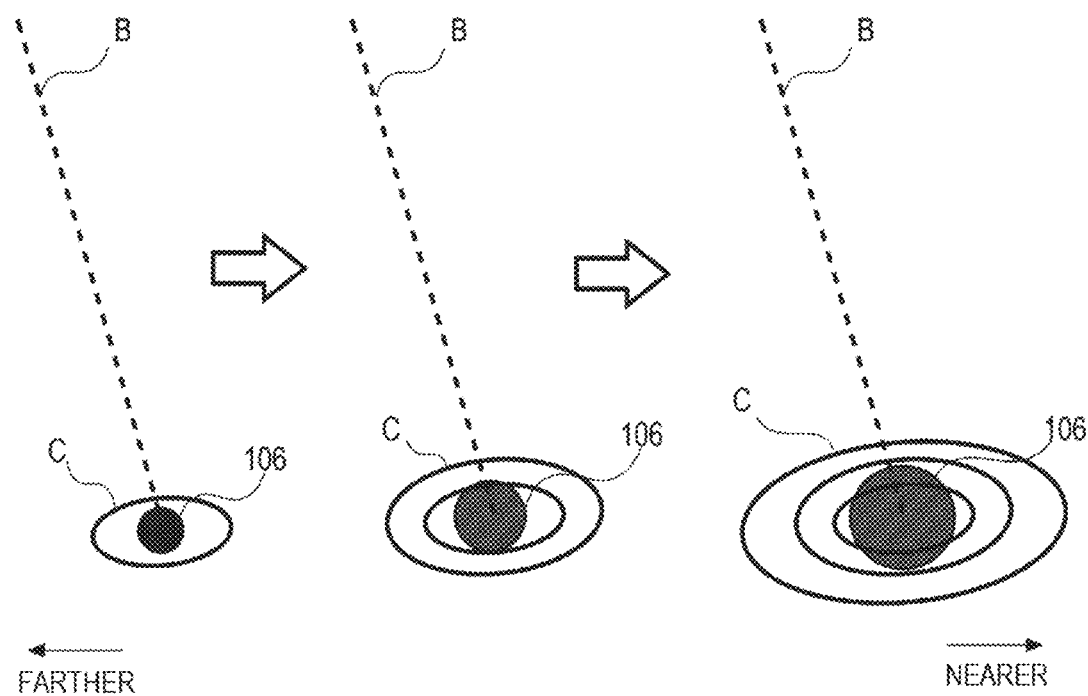
FIG. 3 is a diagram illustrating examples of a mode in which a straight line and a ripple for indicating a location of a fallen object are displayed in the embodiment.

FIG. 3 illustrates an example of a mode in which the straight line B and the ripple C indicating the location of the fallen object 106 is displayed. A display example on a more leftward position in FIG. 3 means being farther from the fallen object 106, while a display example on a more rightward position in FIG. 3 means being nearer to the fallen object 106. As the worker 108 wearing the scope 109 goes nearer to the fallen object 106, the display is performed using an increased number of more ripples C in order for the worker 108 to visually realize that the worker 108 goes nearer to the fallen object 106. In FIG. 3, a farthest fallen object is displayed using a single ripple C, while a nearest fallen object is displayed using three ripples C.

It should be noted that the image of the fallen object 106 taken by the camera device 105 may be shown on the display 153 simultaneously. In this case, the image is displayed in an area where the image does not hinder the display of the fallen object 106 and the straight line B.

Timings at which to search for the fallen object 106 are not limited to daytime. The timings may be after dusk when there is a lack of sunshine. Even in a situation where it is dim outside, the scope 109 displays things such as: the arrow A indicating the direction toward the fallen object 106; the line B extending from the upper to lower sides on the field of view like a rainfall which is displayed in the position of the fallen object 106; and the ripple C indicating the distance to the fallen object. The position of the fallen object, therefore, can be searched for by use of these displays.

Referring to a flowchart in FIG. 4, integrated descriptions will be provided for the above series of the operations.

Once the detection device 110 detects the fallen object 106 by the search of the radar device 100 (S10), the radar control device 101 acquires the position information about the fallen object 106 by identifying the position information from the detection information (S12). The radar control device 101 makes the camera device 105 take an image of the detected fallen object 106 by controlling the camera control device 104, and causes the shape of the fallen object 106 to be checked (S14).

The detection result display device 102 displays the fallen object 106 which is detected by the radar device 100 and whose image is taken by the camera device 105 (S16), and transmits the object information about the fallen object 106 to the scope 109 (S18). The scope 109 performs the AR process on the object information about the fallen object 106 which is acquired from the detection device 110 and causes the display 153 to display the result (S20).

Thus, the worker 108 can realizes specific information about the size, color and the like of the actual fallen object 106. Accordingly, it is possible to achieve an easy search, and a reduction in the search time.

FIG. 2(*a*) and the like show an example of how the large fallen object 106 is detected. In a case where a vast area is searched for the fallen object 106 with a length of several centimeters, the use of the scope 109 according to the present invention makes it possible to reduce the labor and time to be required for the search to a large extent while securing the safety of the worker (a person engaging in the search).

The present invention has been described based on the embodiment. The embodiment has been shown as an example. It should be understood by those skilled in the art that: various modifications can be made to the combination of the components; and such modifications fall within the scope of the present invention. For example, although in the above-discussed embodiment, the scope 109 includes the transparent type (optical transmission type) of display 153, the scope 109 may include a video transmission of display. In this case, the scope 109 is provided with an image capturing device which acquires an image of the outside.

In addition, the above-discussed embodiment has provided the case where the scope 109 acquires the fallen object information (position information and the like) about the fallen object 106 by making the wireless communications with the detection device 110. Nevertheless, the method in which the object search device according to the present invention acquires the position information about the object from the outside is not limited.

The invention claimed is:

1. An object search system comprising:
   a radar device which detects position information about an object;
   a scope to be worn by a user, and including a display which shows an augmented reality space on a real space; and
   a transmitter which transmits the position information about the object to the scope;
   wherein the scope includes
      a wireless receiver which receives the position information about the object transmitted from the transmitter,
      a position sensor which detects position information about the scope, and
      a controller which controls the display to show a position of the object on the display based on the position information about the object and the position information about the scope and to show a ripple including one or more circles that encircle the position of the object on the display, with a number of the one or more circles of the ripple corresponding to a distance from the scope to the position of the object, and the controller sets the number of the one or more circles of the ripple based on the distance from the scope to the position of the object such that the number of the one or more circles is increased as the scope gets closer to object, and
   wherein the controller controls the display to show a straight line indicating the position of the object such that the straight line extends from an upper side of a field of view of the display to the position of the object shown on the display.

2. The object search system according to claim 1, wherein the controller controls the display to show an arrow indicating a direction toward the position of the object.

3. The object search system according to claim 1, further comprising:
   a camera which captures an image of the object; wherein the scope receives the image of the object, and
   the controller controls the display to show the image on the display.

4. A scope to be worn by a user, and including a display which shows an augmented reality space on a real space, comprising:
- a wireless receiver which acquires position information about an object to be searched for;
- a position sensor which detects position information about the scope; and
- a controller which controls the display to show a position of the object on the display based on the position information about the object and the position information about the scope and to show a ripple including one or more circles that encircle the position of the object on the display, with a number of the one or more circles of the ripple corresponding to a distance from the scope to the position of the object, and the controller sets the number of the one or more circles of the ripple based on the distance from the scope to the position of the object such that the number of the one or more circles is increased as the scope gets closer to object;
- wherein the controller controls the display to show a straight line indicating the position of the object such that the straight line extends from an upper side of a field of view of the display to the position of the object shown on the display.

5. The scope according to claim 4, wherein the controller controls the display to show an arrow indicating a direction toward the position of the object.

6. An object search method comprising:
acquiring position information about an object;
detecting position information about a scope worn by a user that includes a display which shows an augmented reality space on a real space;
displaying a position of the object on the display based on the position information about the object and the position information about the scope, the position of the object shown on the display in the augmented reality space being based on the position information about the object and the position information about the scope;
displaying a ripple including one or more circles that encircle the position of the object on the display, with a number of the one or more circles of the ripple corresponding to a distance from the scope to the position of the object;
setting the number of the one or more circles of the ripple displayed at the position of the object on the display based on the distance from the scope to the position of the object such that the number of the one or more circles is increased as the scope becomes closer to object; and
displaying a straight line indicating the position of the object on the display such that the straight line extends from an upper side of a field of view of the display to the position of the object shown on the display.

* * * * *